Patented June 30, 1931

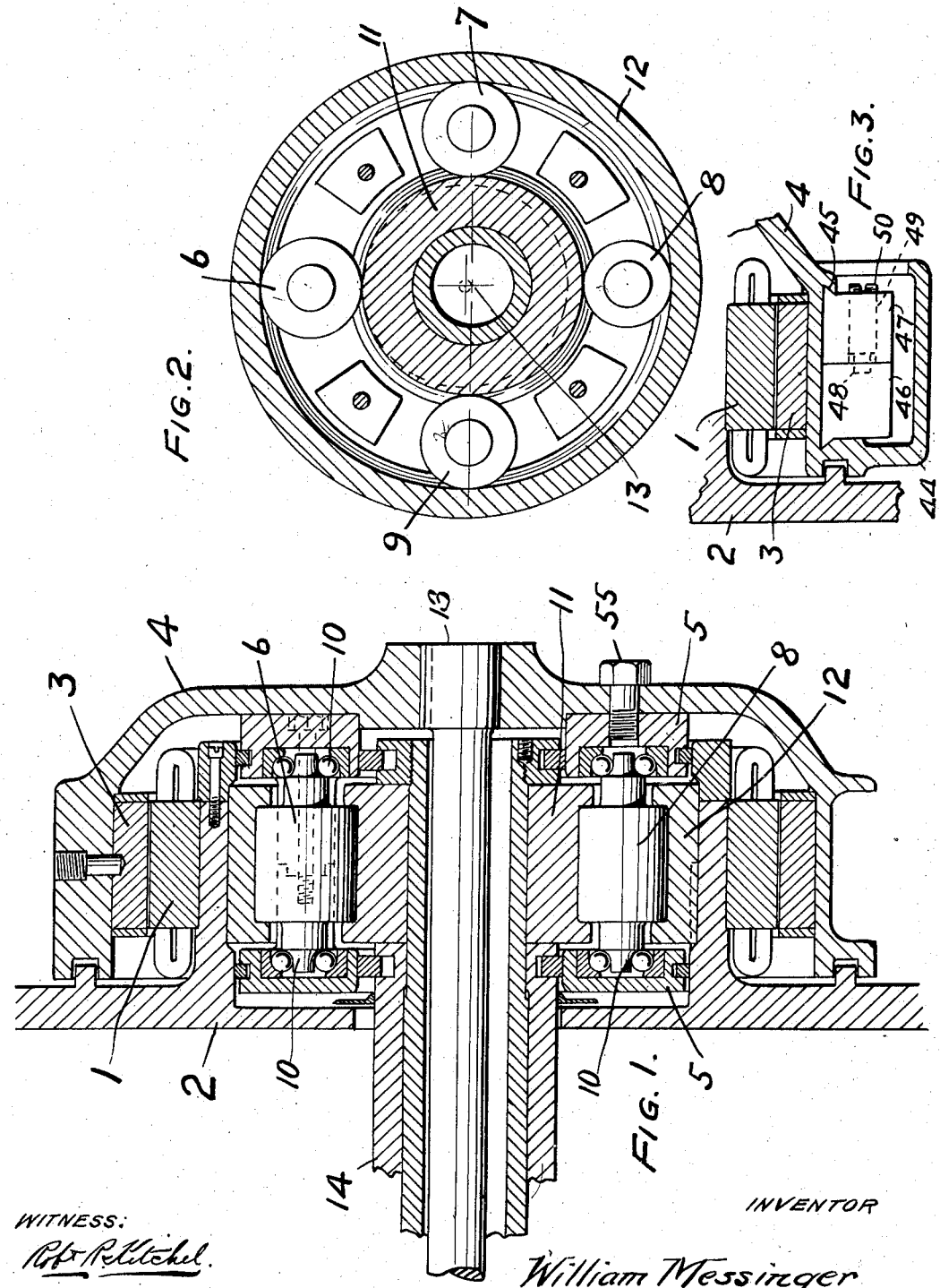

1,812,109

UNITED STATES PATENT OFFICE

WILLIAM MESSINGER, OF PHILADELPHIA, PENNSYLVANIA

MEANS FOR SECURING ECCENTRIC MOTION

Application filed May 14, 1930. Serial No. 452,261.

The subject of my invention is an improved device for securing eccentric motion. In general, it consists of an electric motor the rotor of which is attached to the cage of a roller bearing. Two of the rollers of the bearing, which are mounted diametrically opposite, are of different diameter. The two intermediate rollers, which are mounted at 90°, are of a diameter intermediate to the diameters of the first mentioned rollers.

My device is particularly adapted to shake or reciprocate screens but it is capable of use wherever eccentric motion is desired.

A further feature of my invention is that two such motors and bearings may be keyed in the same relative positions to the ends of a shaft or tube whereby the shaft or tube is actuated from both ends.

Another feature of my invention consists in providing for the centrifugal force of the motor by making the casing of the motor of decreased thickness adjacent the smallest roller or by providing adjustable weights.

For a further exposition of my invention reference may be had to the annexed drawings and specification at the end whereof my invention will be specifically pointed out and claimed.

In the drawings,

Figure 1 is a cross section elevation through my device.

Figure 2 is an end view of the bearing which forms part of my device, and

Figure 3 is a detailed view in cross section showing a modified form of counterbalancing the eccentric weight.

In the illustration shown, 1 is the stator of an induction motor carried upon a frame 2, which may be a side wall of a vibrating screen. 3 is the rotor of the induction motor. When the stator 1 is suitably excited from an alternating current supply, the rotor 3 is propelled carrying with it the surrounding fly wheel or counterbalance wheel 4. To the web of wheel 4 is attached by means of bolts 55 or in any other convenient manner, a roller bearing cage or frame 5. Cage 5 in turn serves as keeper to four rollers 6, 7, 8 and 9 of a journal roller bearing. Roller 6 is of larger diameter than roller 8 diametrically opposite to it. Rollers 7 and 9, which are spaced at distances of 90° from rollers 6 and 8, are of equal diameter. The rollers have projecting trunnions which are journaled in cup and cone style ball bearings 10.

As the balance wheel rotates carrying with it cage 5 the four rollers traverse over the cylindrical surface of roller bearing inner race 11 and within the bore of roller bearing outer race 12. 12 is held stationary in frame 2. By reason of the uneven size of rollers 6 and 8 the inner race 11 of the roller bearing has imparted to it a gyrating movement, the axis 13 describing a circle whose radius is equal to the difference between the diameters of rollers 6 and 8. The gyrating movement is transmited to a tube 14 which extends to the left and at the end of which is mounted another eccentric motion roller bearing similar to the one just described, likewise propelled by a similarly constructed motor and balance wheel.

Whatever apparatus, screen or container may be carried upon or suspended from tube 14, receives a gyrating or eccentric motion. The centrifugal force of such apparatus must be counterbalanced and this is accomplished by making the rim of wheel 4 of varying thickness or by applying movable counterbalancing weights. To insure unison of action of the eccentric motion roller bearings at the two ends of tube 14 the roller cages 5 are tied together through shaft 13 which is splined to the hubs of the two wheels 4.

The primary application of this device is to operate a vibrating screen or separator. The present screens require an eccentric shaft and four roller bearing journals. By means of my eccentric motion roller bearing it is possible to dispense with two bearings. The driving motor, the roller bearing and the necessary counterbalance wheel are all incorporated, with the result that the width of the entire screen is materially condensed.

Instead of rollers 6, 7, 8 and 9, balls of like diameters may be substituted, and the quantity of rollers or balls may be varied.

In Figure 3 there is shown a modified means of counterbalancing the wheel 4. This consists in providing wheel 4 with an outer rim 44 and forming wedge shaped grooves (unnumbered) adjacent the inner side of the cavity formed between this rim and the wheel 4 itself. In these wedge shaped grooves fit tongues 45 which are part of weights 46 and 47. These weights are also made with cavities 48 and 49, the latter cavity being screw-threaded to receive stud 50. By the engagement of stud 50 against the bottom of cavity 48, weights 46 and 47 are clamped on wheel 4. By loosening stud 50, weights 46 and 47 may be adjusted around wheel 4 to the desired counterbalancing position and the stud 50 then tightened thus clamping the weights in that position.

I do not intend to be limited in the practice of my invention save as the scope of the prior art and of the attached claim may require.

I claim:

Mechanism of the type recited comprising in combination eccentrically arranged inner and outer circular races of which the outer one is fixed and of which the inner one gyrates around the axis of the fixed race, a cage rotatable about the axis of the fixed race as a center, rolling elements of different diameters arranged between the races and mounted in the cage for revolution about their own axes, the axes of the rolling elements being spaced different radial distances from the axis of the cage, and means for driving the cage.

WILLIAM MESSINGER.